United States Patent [19]
Jibbe et al.

[11] Patent Number: 5,287,462
[45] Date of Patent: Feb. 15, 1994

[54] BUFFERLESS SCSI TO SCSI DATA TRANSFER SCHEME FOR DISK ARRAY APPLICATIONS

[75] Inventors: Mahmoud K. Jibbe; Craig C. McCombs, both of Wichita, Kans.

[73] Assignee: NCR Corporation, Dayton, Ohio

[21] Appl. No.: 811,481

[22] Filed: Dec. 20, 1991

[51] Int. Cl.$^5$ .............................................. G06F 15/02
[52] U.S. Cl. .................................................... 395/275
[58] Field of Search .................... 395/275, 725, 425; 371/10.1, 21.1, 40.1, 40.2, 40.4

[56] References Cited

U.S. PATENT DOCUMENTS

| | | | |
|---|---|---|---|
| 4,716,525 | 12/1987 | Gilanyi et al. | 364/200 |
| 4,722,085 | 1/1988 | Flora et al. | 371/38 |
| 4,864,532 | 9/1989 | Reeve et al. | 364/900 |
| 4,914,656 | 4/1990 | Dunphy, Jr. et al. | 371/10.2 |
| 5,077,736 | 12/1991 | Dunphy et al. | 371/10.1 |
| 5,088,081 | 2/1992 | Farr | 371/10.1 |
| 5,128,810 | 7/1992 | Halford | 364/900 |
| 5,146,588 | 9/1992 | Crater et al. | 395/575 |
| 5,148,432 | 9/1992 | Gordon et al. | 371/10.1 |
| 5,191,584 | 3/1993 | Anderson | 371/10.1 |
| 5,206,943 | 4/1993 | Callison et al. | 395/425 |

OTHER PUBLICATIONS

"A Case For Redundant Arrays of Inexpensive Disks (Raid)" by David A. Patterson, et al., Computer Science Division (EECS) University of California, Report No. UCB/CSD 87/391, Dec. 1987.

*Primary Examiner*—Dale M. Shaw
*Assistant Examiner*—Moustafa Meky
*Attorney, Agent, or Firm*—James M. Stover

[57] ABSTRACT

An array controller including a novel data path structure for effecting data transfers between a host computer system bus and four array busses associated with a RAID level 3 disk array without the utilization of a buffer between the host system and the array. The data path structure includes a host register associated with each array bus, each host register being connected to the host bus for receiving data therefrom; a first array register associated with each array bus, each first array register being connected to a corresponding host register for receiving data therefrom and connected to its associated array bus for providing data thereto; and a second array register associated with each array bus, each second array register being connected to it associated array bus for receiving data therefrom and connected to the host bus for providing data thereto. A state machine coordinates the operation of the host and array registers to effect RAID level 3 read and write transfers between the host system and four array channels. The state machine includes logic for generating, in response to a write request from the host system, strobe signals for effecting the transfer of data from the host bus into the host registers, for effectuating the transfer of data from the host registers into corresponding first array registers, and for bringing about the transfer of data from the first array registers onto their corresponding array busses. In response to a read request, logic within the state machine generates strobe signals which are provided to the second array registers for effecting the transfer of data from the array busses into corresponding second array registers and the transfer of data from the second array registers onto the host bus.

12 Claims, 14 Drawing Sheets

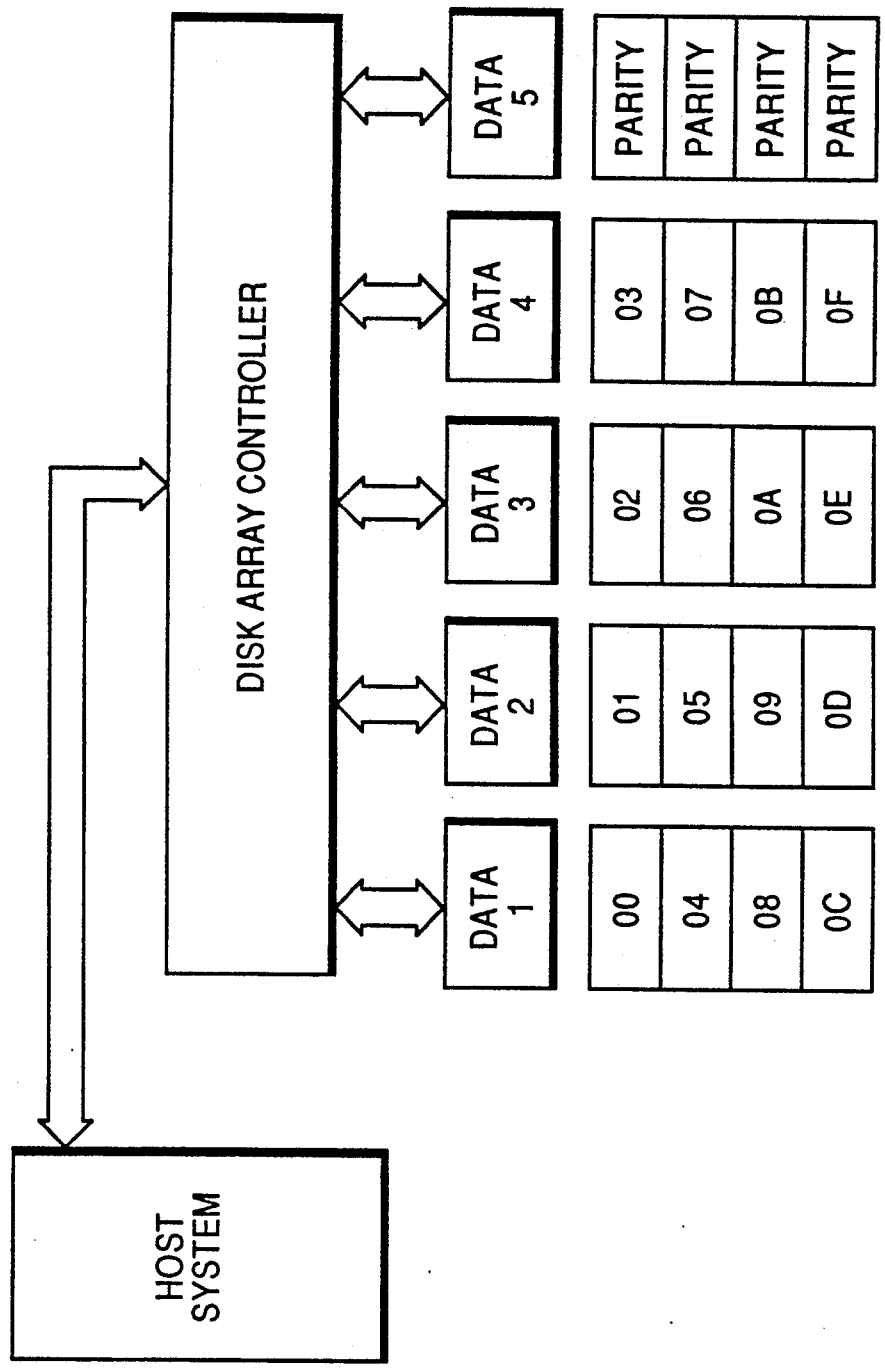

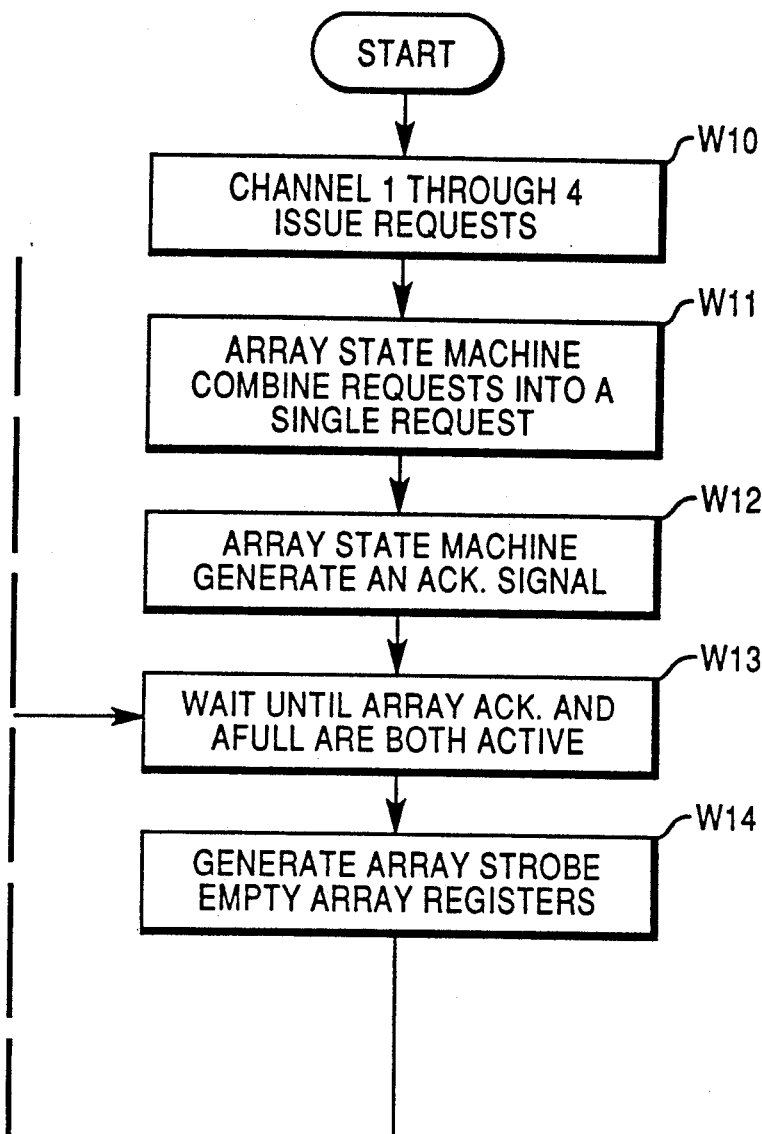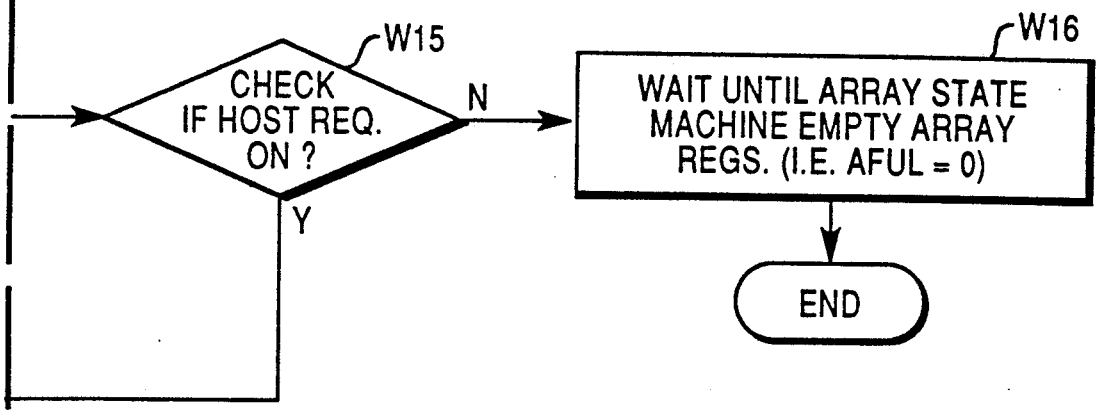
FIG. 3B

BUFFERLESS SCSI TO SCSI DATA TRANSFER SCHEME FOR DISK ARRAY APPLICATIONS

The present invention relates to disk array controllers and, more particularly, to a more efficient scheme for effecting data transfers between a host computer system and a multiplicity of disk drives.

BACKGROUND OF THE INVENTION

Disk arrays comprising a multiplicity of small inexpensive disk drives, such as the 5¼ A or 3⅜ inch disk drives currently used in personal computers and workstations, connected in parallel have emerged as a low cost alternative to the use of single large disks for non-volatile storage of information within a computer system. The disk array appears as a single large fast disk to the host system but offers improvements in performance, reliability, power consumption and scalability over a single large magnetic disk. Several disk array alternatives are discussed in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks.

One such array system described in the incorporated article, identified as a RAID level 3 system, comprises one or more groups of N+1 disks. Within each group, N disks are used to store data, and the additional disk is utilized to store parity information. During RAID level 3 write functions, each block of data is divided into N portions for storage among the N data disks. The corresponding parity information is written to a dedicated parity disk. When data is read, all N data disks must be accessed. The parity disk is used to reconstruct information in the event of a disk failure. A RAID level 3 system including five drives is shown in FIG. 1. The disk drives are labeled DATA 1 through DATA 5. Data is striped across disks DATA 1 through DATA 4, each data disk receiving a portion of the data being saved. Parity information, generated through a bit-wise exclusive-OR of the data stored on drives DATA 1 through DATA 4, is saved on drive DATA 5.

In order to coordinate the operation of the multitude of disk drives within the array to perform read and write functions, parity generation and checking, and data restoration and reconstruction, complex storage management techniques are required. In many of the disk array systems described in the prior art, the host operates as the array controller and performs the parity generation and checking and other storage management operations. Other systems, such as the system illustrated in FIG. 1, employ a separate I/O controller associated with the disk array for controlling the operations listed above.

Currently available array controllers for RAID level 3 disk arrays utilize a buffer between the host and the array. As storage is a key determinate in system cost and performance, a transfer scheme which eliminates the requirement of a large expensive buffer between the host and the array channels is desired.

OBJECTS OF THE INVENTION

It is therefore an object of the present invention to provide a new and improved scheme for effecting data transfers between a host device and an array of disk drives.

It is still a further object of the present invention to provide a simple, cost effective apparatus for implementing such a transfer scheme.

It is yet another object of the present invention to provide a new and improved method and apparatus for implementing RAID level 3 transfers between a host and an array of disk drives.

It is an additional object of the present invention to provide such a method and apparatus which eliminates the requirement of a large buffer between the host and the array of disk drives.

It is also an object of the present invention to provide an array controller for effecting RAID level 3 operations without the utilization of a storage buffer between the host and the array of disk drives.

SUMMARY OF THE INVENTION

There is provided, in accordance with the present invention, apparatus for coupling a host bus associated with a host computer system with a plurality of array busses associated with an array of disk drives. The apparatus includes a host register associated with each array bus, each host register being connected to the host bus for receiving data therefrom; a first array register associated with each array bus, each first array register being connected to a corresponding host register for receiving data therefrom and connected to its associated array bus for providing data thereto; and a second array register associated with each array bus, each second array register being connected to it associated array bus for receiving data therefrom and connected to the host bus for providing data thereto.

The described embodiment includes a state machine for coordinating the operation of the host and array registers to effect RAID level 3 read and write transfers between the host system and four array channels. The state machine includes logic for generating, in response to a write request from the host system, a data strobe signal for effecting the transfer of data from the host bus into the host registers, a transfer strobe signal for effectuating the transfer of data from the host registers into corresponding first array registers, and an array strobe signal for bringing about the transfer of data from the first array registers onto their corresponding array busses. In response to a read request, logic within the state machine generates strobe signals which are provided to the second array registers for effecting the transfer of data from the array busses into corresponding second array registers and the transfer of data from the second array registers onto the host bus.

The above and other objects, features, and advantages of the present invention will become apparent from the following description and the attached drawings.

BRIEF DESCRIPTION OF THE DRAWINGS

FIG. 1 is a block diagram representation of a RAID level 3 array including four data disk drives and one parity disk drive.

Figure 3A:
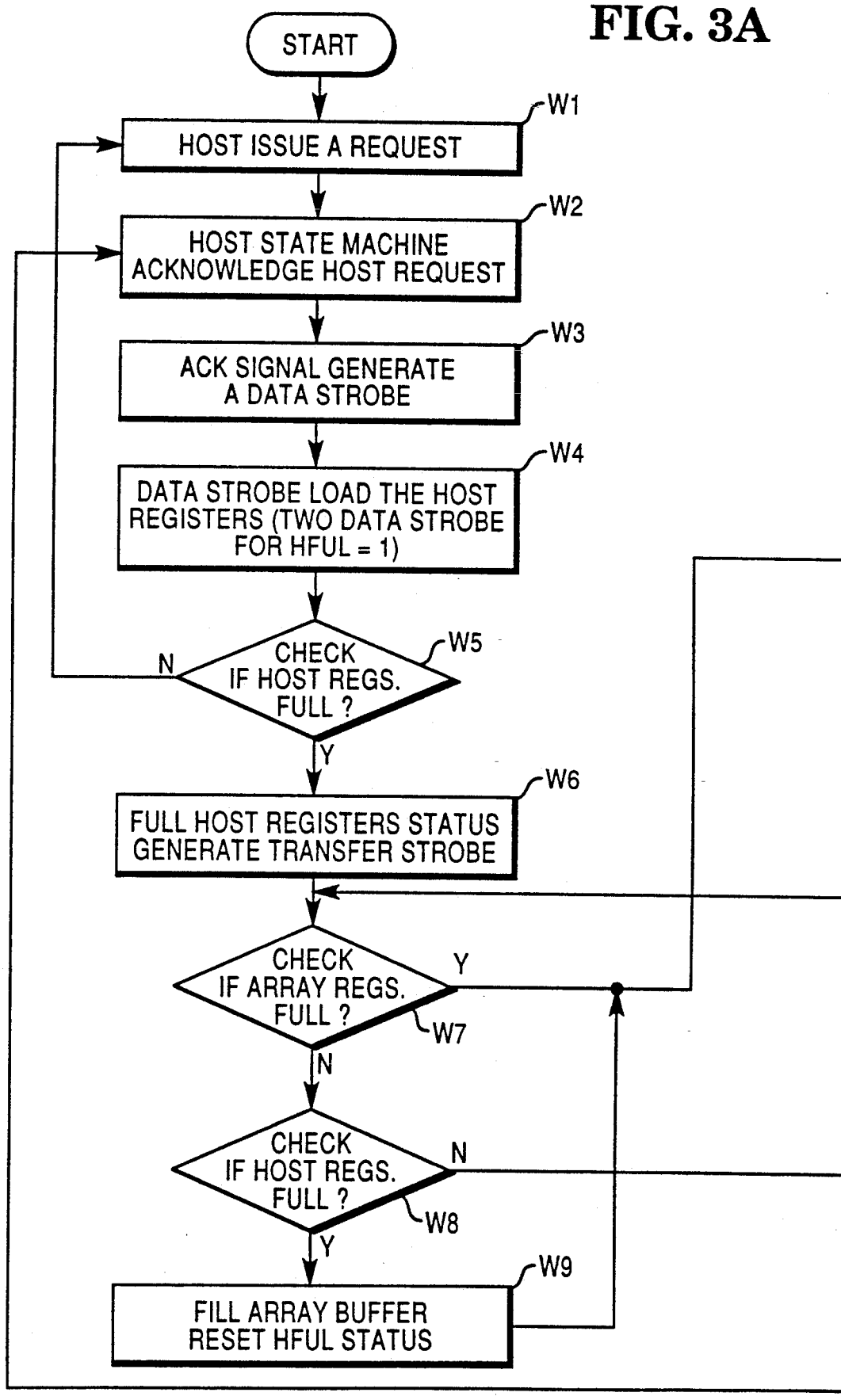

The flow chart of FIGS. 3A and 3B illustrate a method for transferring data from a host device to a disk array in accordance with the present invention.

Figure 4A:
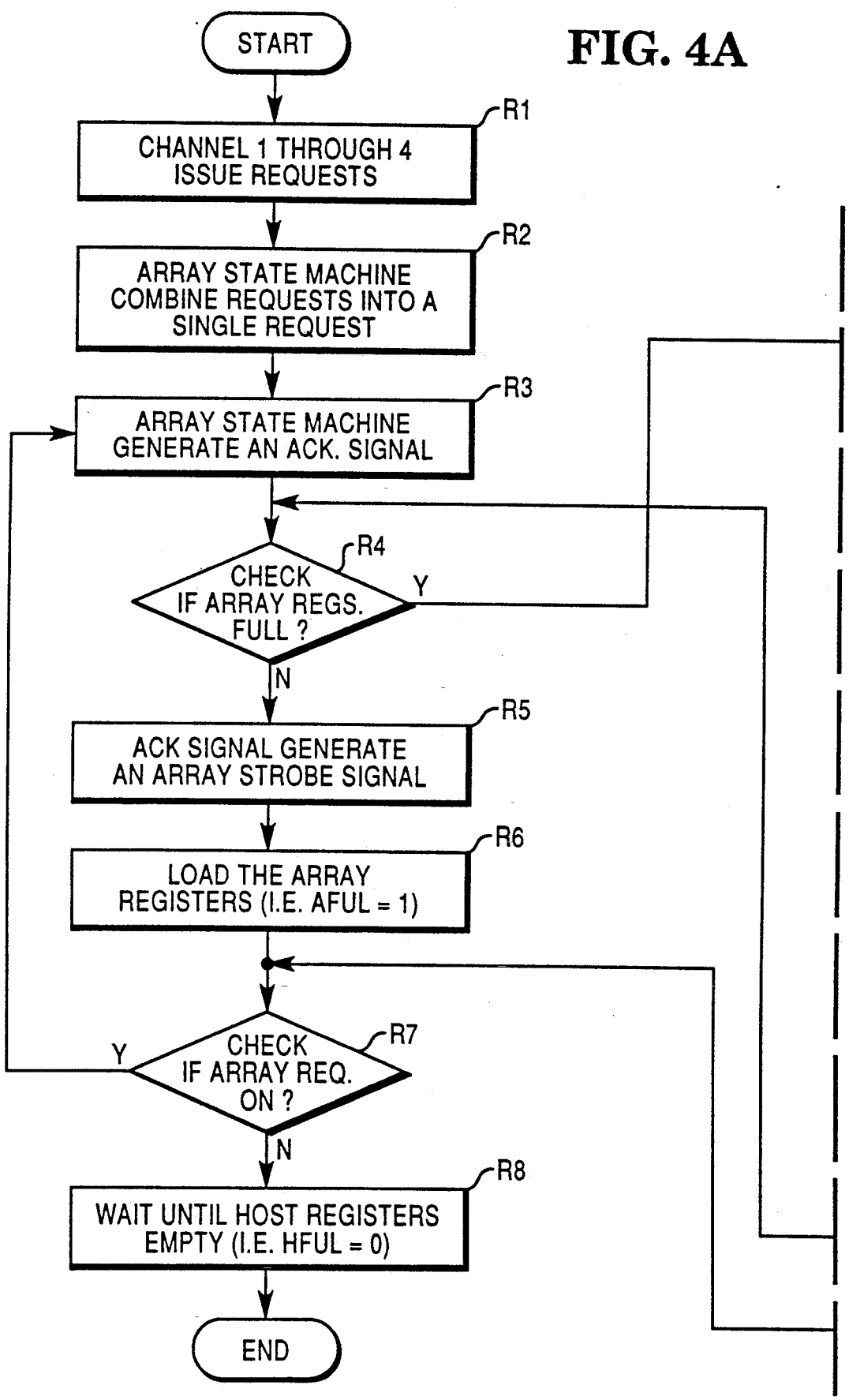
Figure 4B:
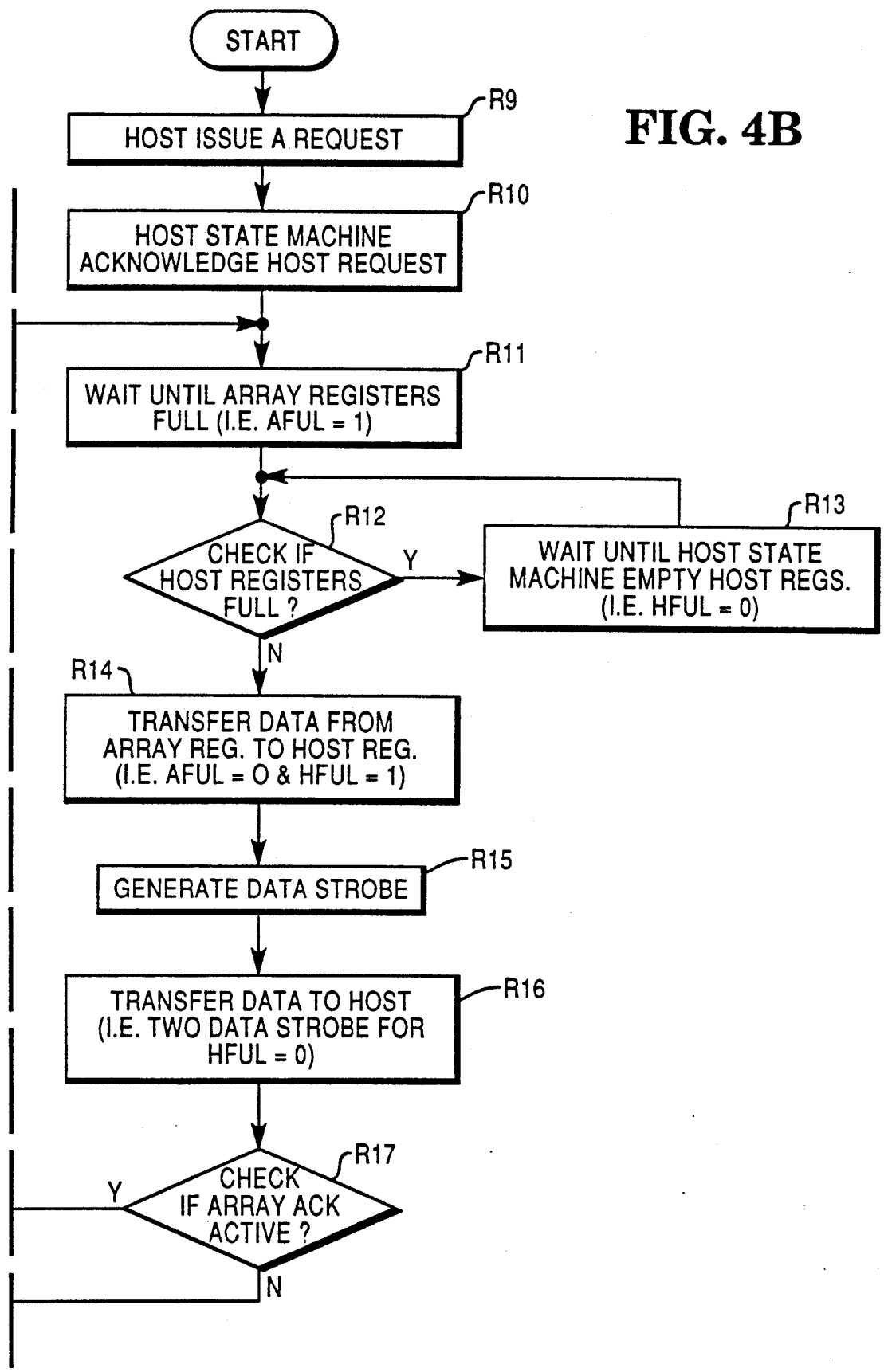

The flow chart of FIGS. 4A and 4B illustrate a method for transferring data from a disk array to a host device in accordance with the present invention.

Figure 5:
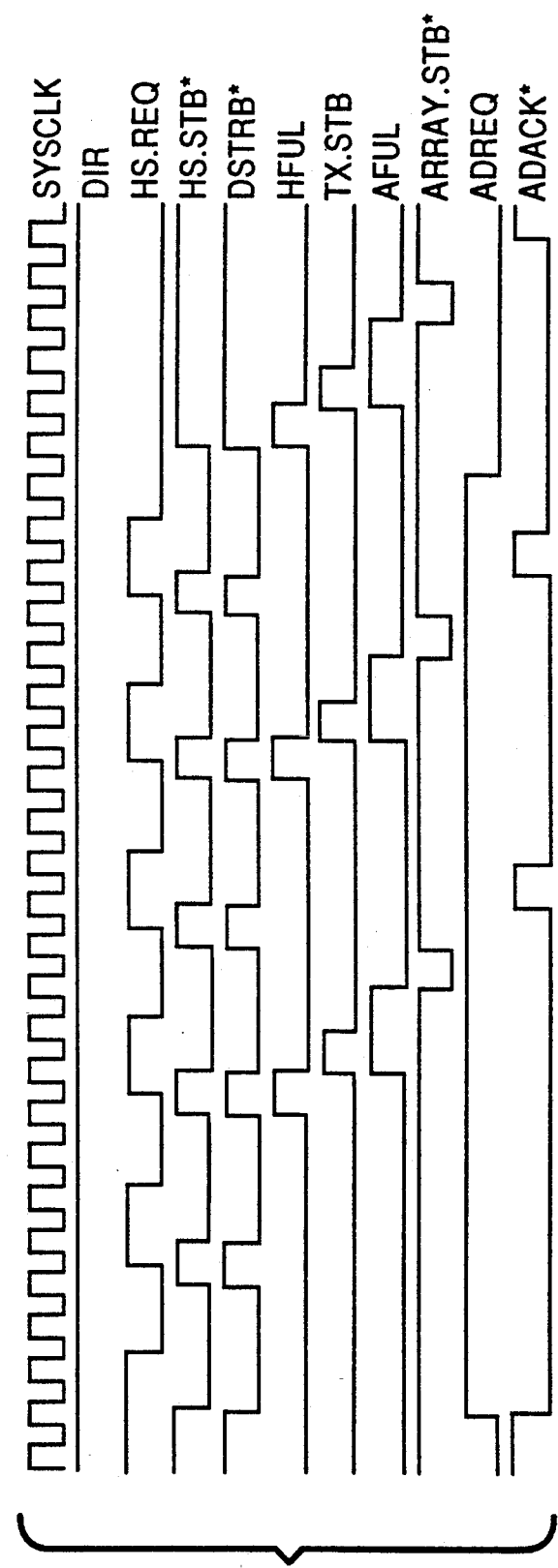

FIG. 5 is a time diagram for the write operation shown in the flow chart of FIGS. 3A and 3B.

Figure 6:
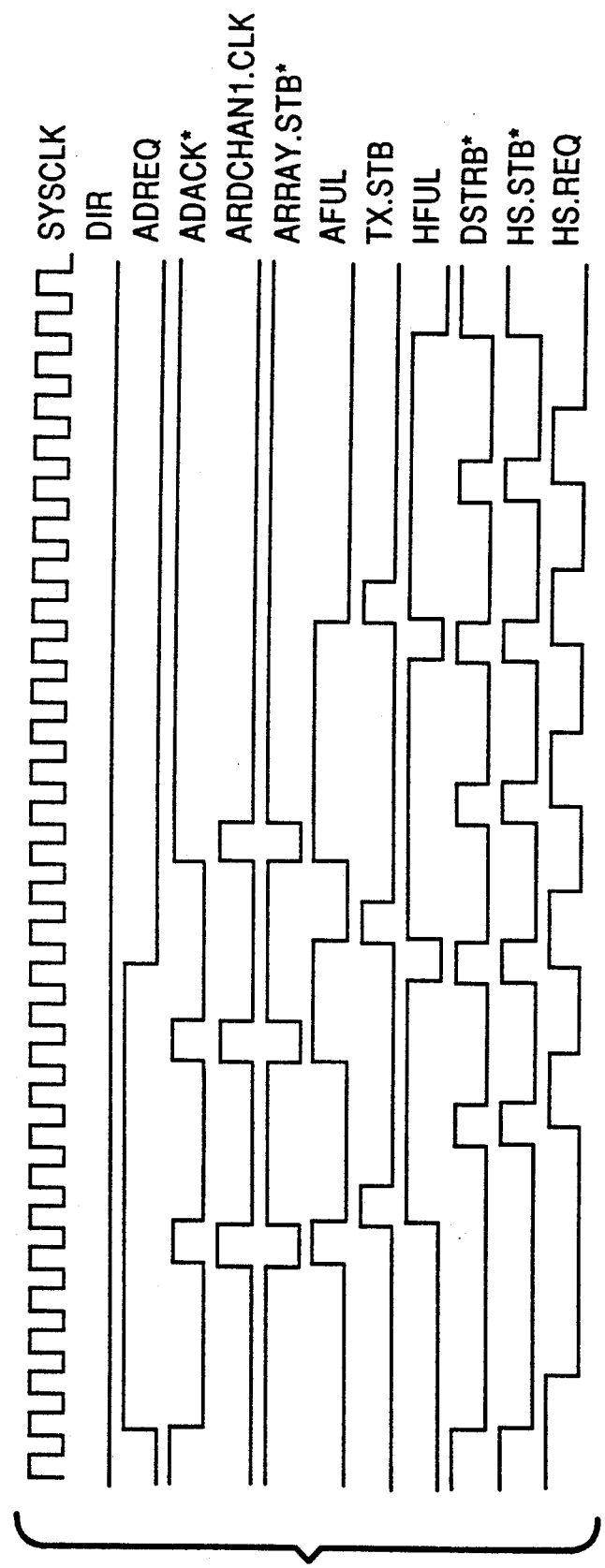

FIG. 6 is a time diagram for the read operation shown in the flow chart of FIGS. 4A and 4B.

Figure 2A:
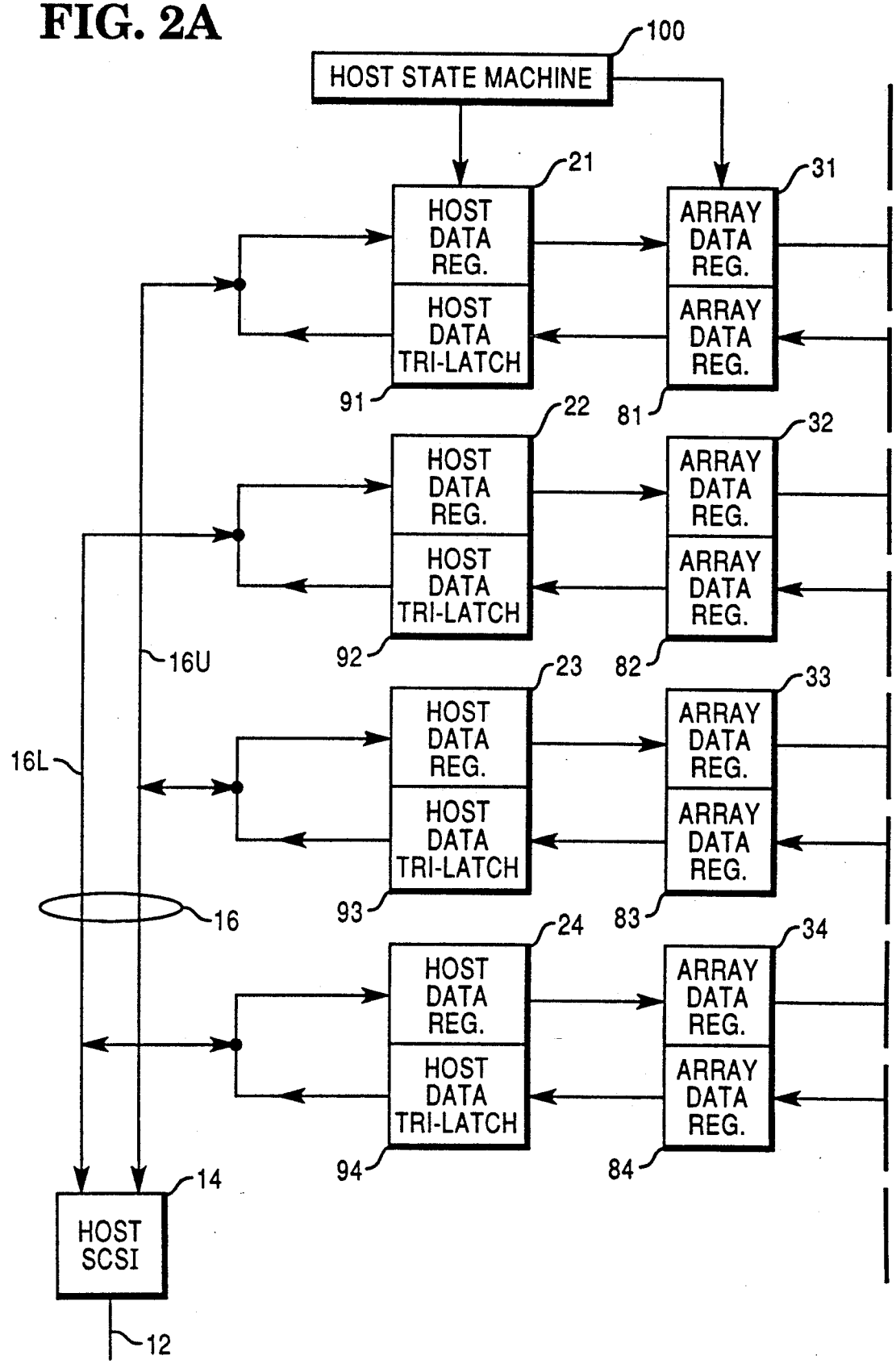
FIGS. 2A and 2B illustrate a functional block diagram of a circuit for effecting bufferless data transfers between one host SCSI channel and an array of SCSI channels associated with a disk array in accordance with the present invention.
Figure 2B:
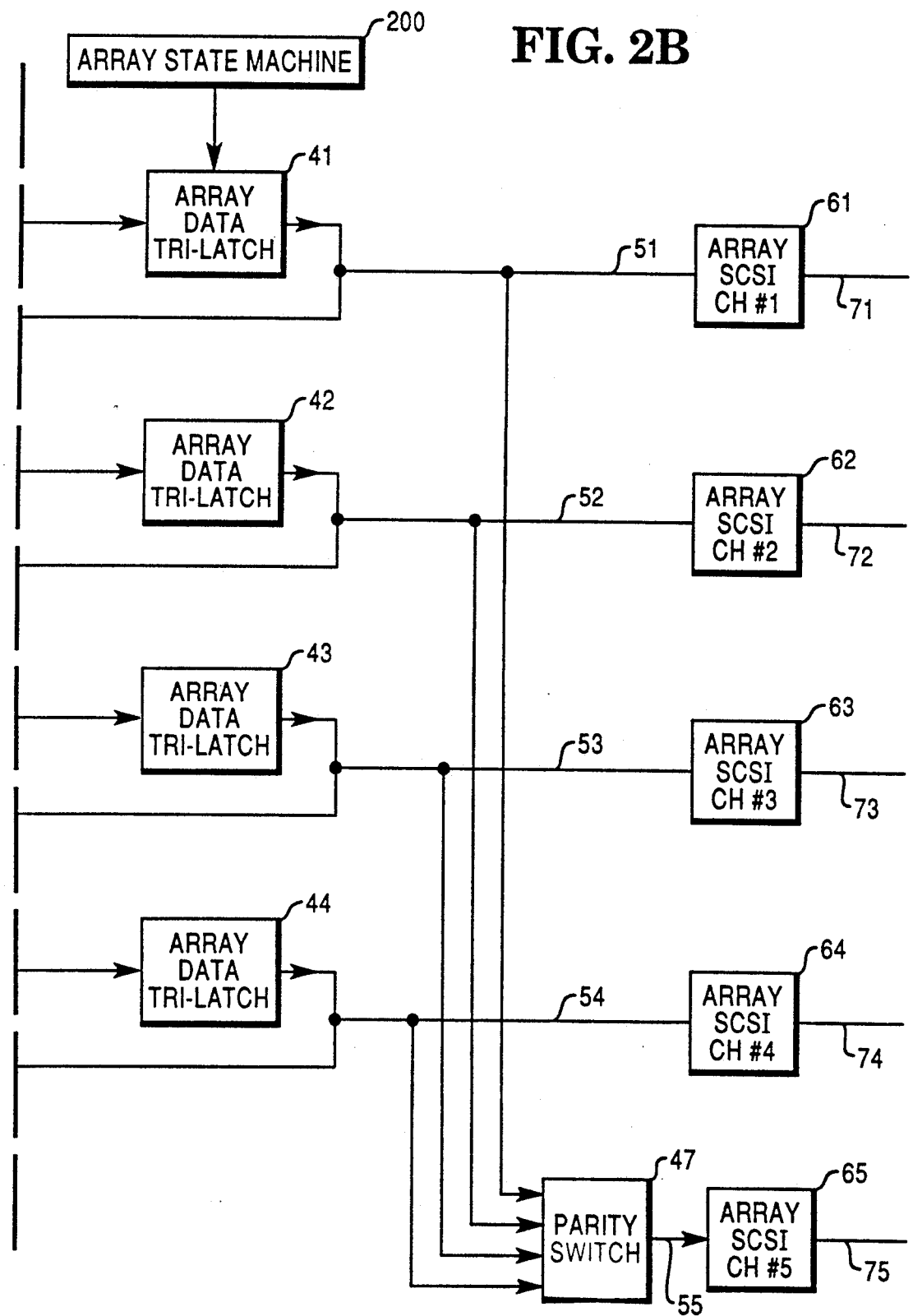
Figure 7:
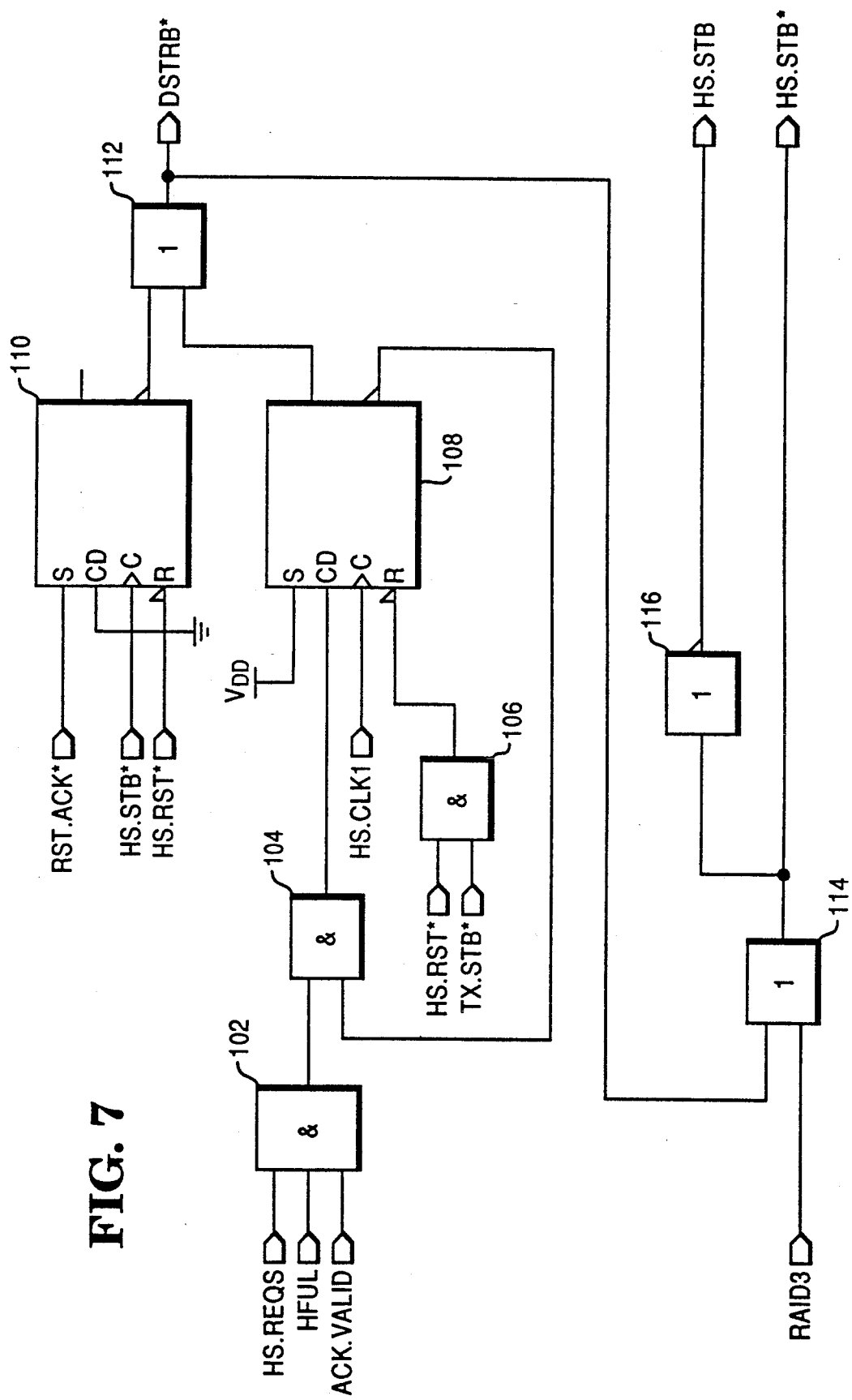

FIG. 7 is a schematic diagram of a portion of the host state machine logic, shown in FIGS. 2A and 2B, for generating a host register strobe signal.

Figure 8:
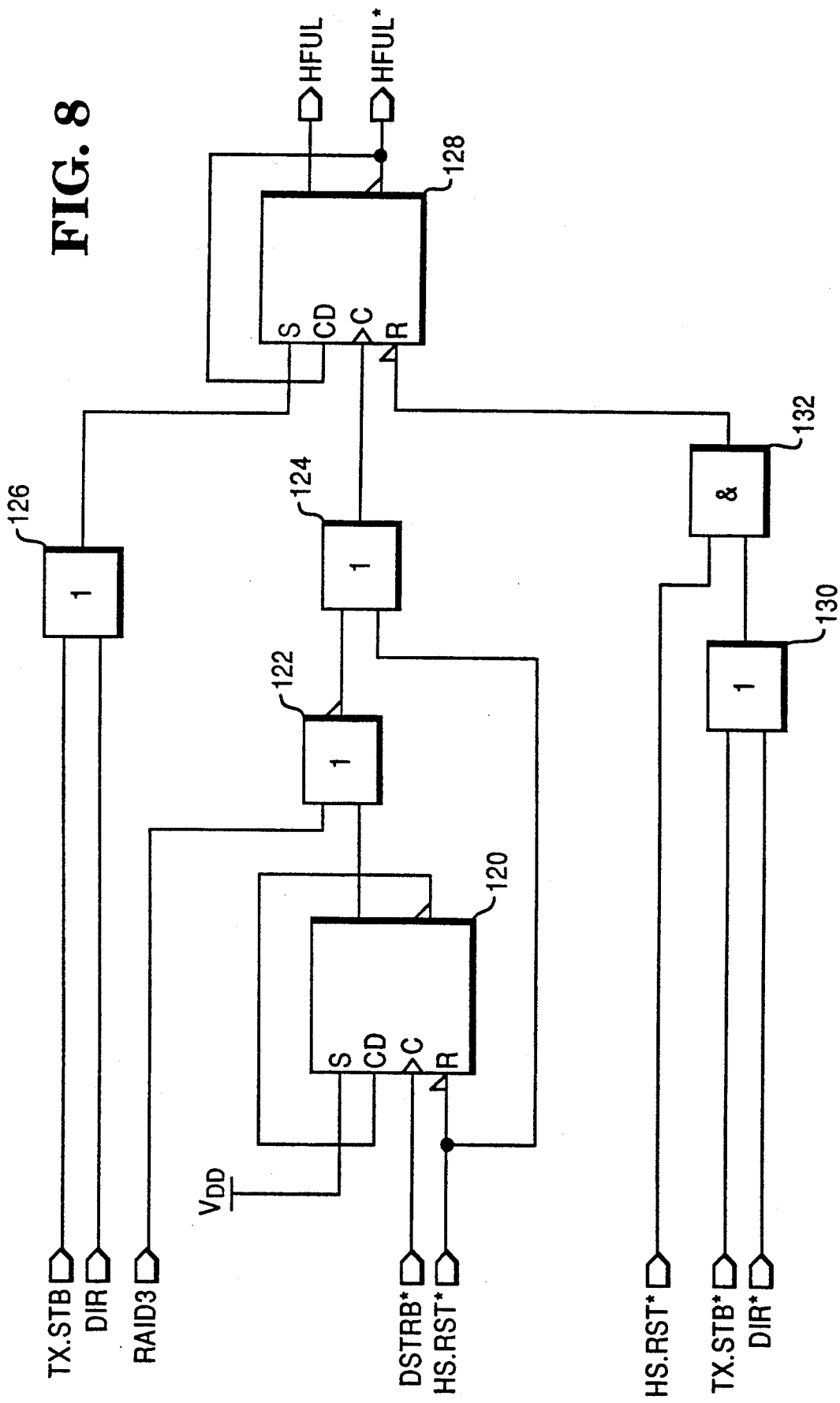

FIG. 8 is a schematic diagram of a portion of the host state machine logic for generating a host register full status signal.

Figure 9:
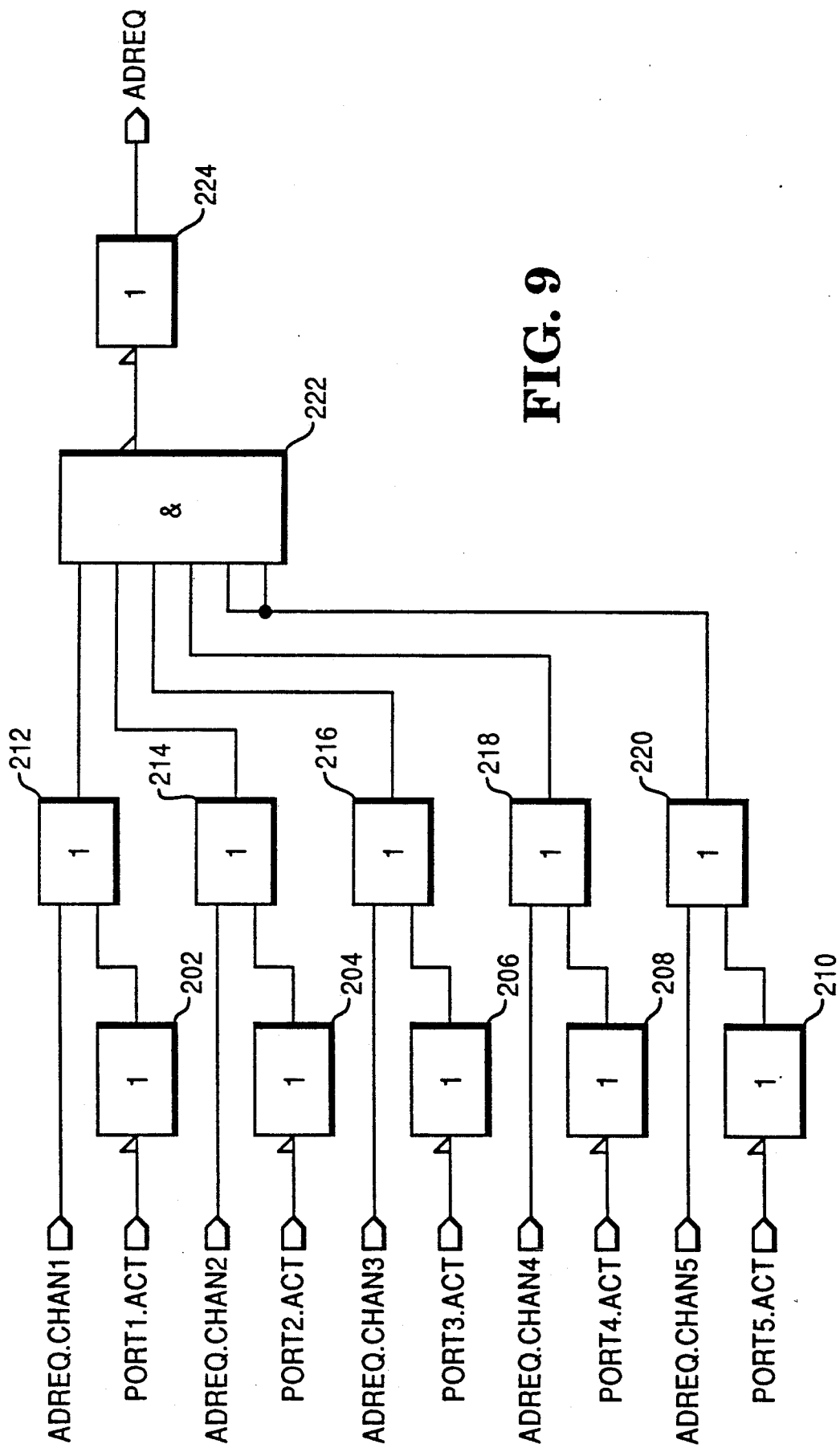

FIG. 9 is a schematic diagram of a portion of the array state machine logic, shown in FIGS. 2A and 2B, for generating an array request signal.

Figure 10:
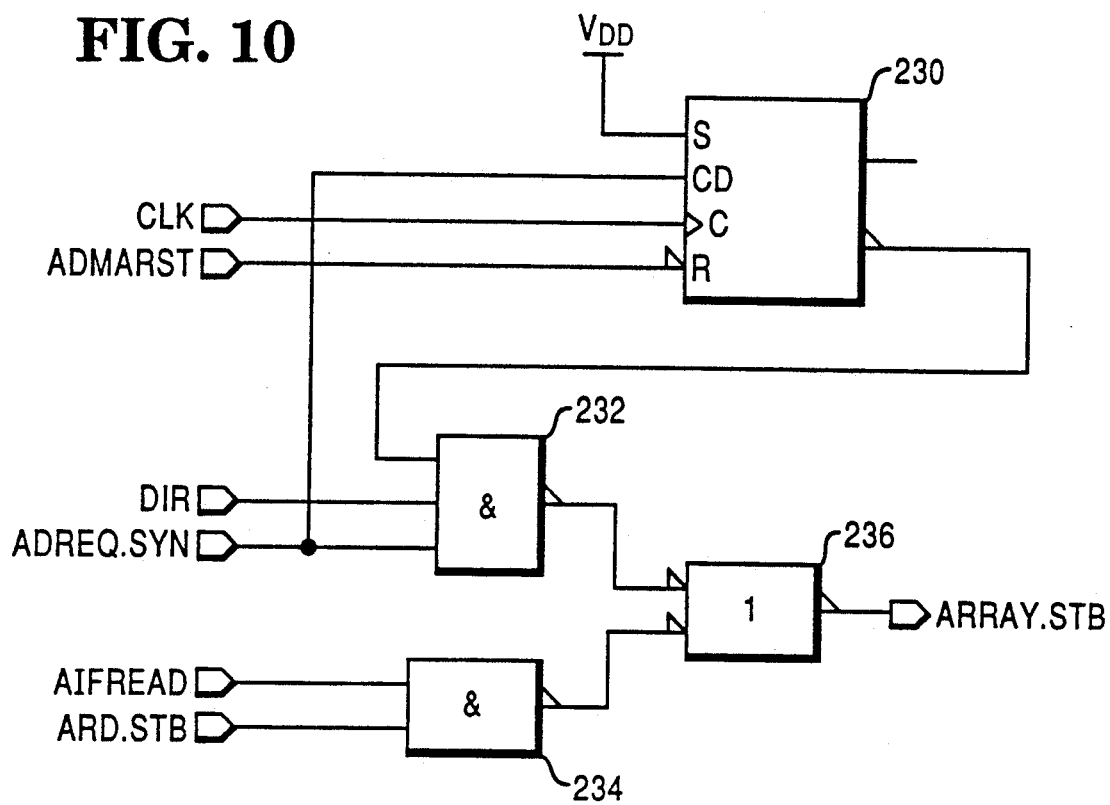

FIG. 10 is a schematic diagram of a portion of the array state machine logic for generating an array register strobe signal.

Figure 11:
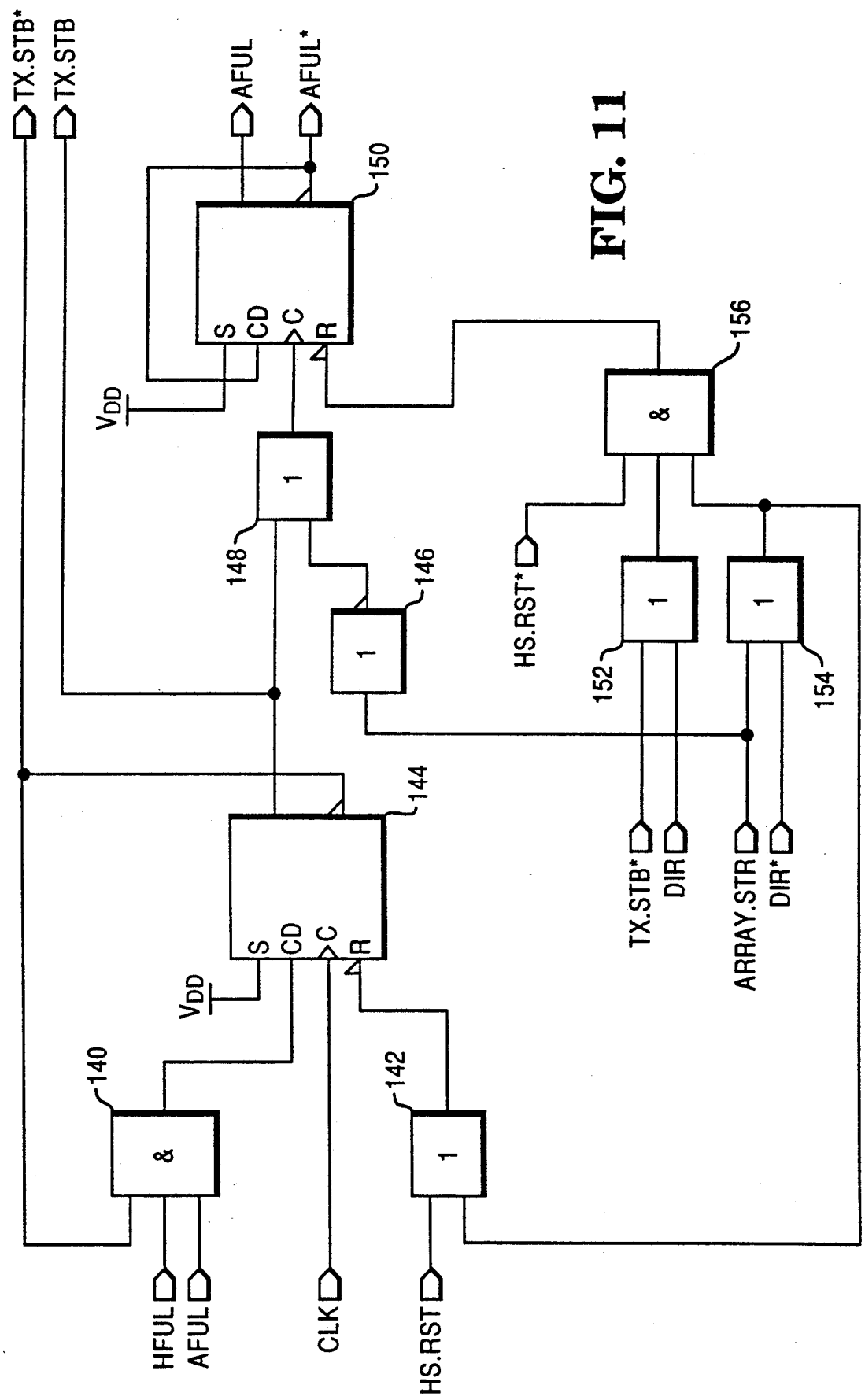

FIG. 11 is a schematic diagram of a portion of the host state machine logic for generating a data transfer strobe signal and an array register full signal.

Figure 12:
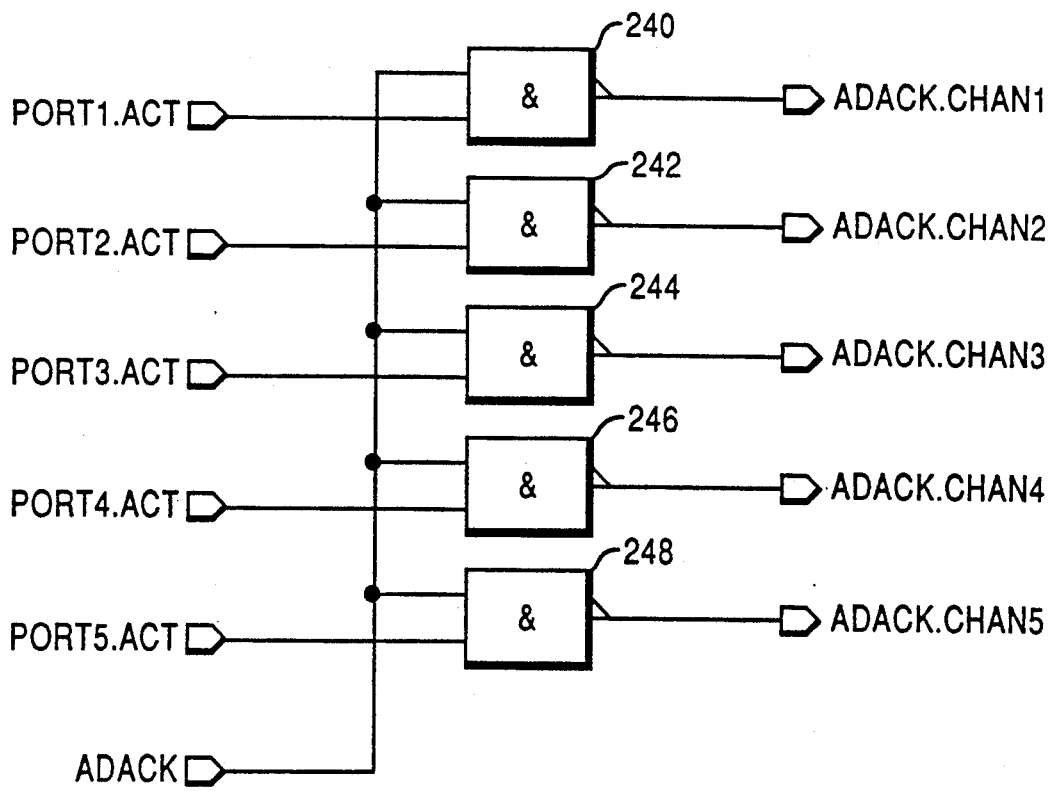

FIG. 12 is a schematic diagram of a portion of the array state machine logic for generating individual array channel acknowledge signals.

DETAILED DESCRIPTION OF THE PREFERRED EMBODIMENT

A functional block diagram of a circuit for effecting bufferless data transfers between an eighteen-bit (sixteen data bits and two parity bits) host system data bus 12 and an array of nine-bit (eight data bits and one parity bit) disk drive busses 71 through 75 associated with a RAID level 3 disk array is illustrated in FIGS. 2A and 2B. The disk array comprises five disk drives, four of which store data and one for storing parity information. During write operations, the circuit functions to hold data received from the host until the disk array is ready to accept the data and to convert the data from eighteen-bit bus 12 to nine-bit busses 71 through 74. During read operations the transfer circuit 70 holds the data received from the disk array until the host system is ready to accept the data and converts the data from the nine-bit array busses to the eighteen-bit host bus.

The circuit includes a host SCSI adapter 14 to interface between the host system data bus 12 and two nine-bit SCSI data busses 16U and 16L. Four array data channels are shown, each channel providing a data path from one of SCSI busses 16U or 16L to a corresponding one of disk drive busses 71 through 74. The first data channel includes a host data register 21 connected to receive data from bus 16U, a first array data register 31 connected to receive the output of host data register 21, an array data latch 41 connected to receive the output of register 31, a data bus 51 connected to receive the output of latch 41, and a SCSI bus interface chip 61 linking SCSI bus 51 with array data bus 71. The remaining three data channels are similarly constructed, connecting host busses 16U or 16L through respective host data registers 22 through 24, first array data registers 32 through 34, array latches 42 through 44, SCSI data busses 52 through 54, and SCSI bus interface chips 62 through 64 with disk drive busses 72 through 74.

For effecting transfers from disk drive bus 71 to bus 16U, the first data channel includes a second array data register 81 connected to receive data from bus 51 and a host data latch 91 connected between register 81 and bus 16U. Each of the remaining data channels also include a second array data register and a host data latch. The second array data registers for the second, third and fourths data channels are identified by reference numerals 82 through 84, respectively. The host data latches for the second, third and fourths data channels are identified by reference numerals 92 through 94, respectively.

The operation of the data registers and host data latches described above is governed by a host state machine 100. An array state machine 200 controls the operation of array data latches 41 through 44. State machines 100 and 200 are discussed in greater detail below.

Also shown in FIGS. 2A and 2B, but not forming part of the present invention, is a parity circuit 47 for generating parity information. Parity circuit 47 includes connections to each of one of data busses 41 through 44 for receiving data therefrom and a connection through bus 55 and SCSI interface module 65 to disk drive bus 75 for providing parity information to the parity disk drive Parity circuit 47 generates parity information for RAID level 3 operations by performing a bit-wise exclusive-OR of the data received from data busses 41 through 44.

The flow chart of FIGS. 3A and 3B illustrates a method for transferring data from SCSI interface 14 on the host side of the transfer circuit to any pair of disk drives (two data drives and one parity drive) or any two pairs of disk drives (four data drives and one parity drive) within the array. Data received from the host is loaded into host data registers 21 through 24, transferred from the full host data registers into array data registers 31 through 34, and then provided to the disk array busses.

Referring now to FIGS. 3A and 3B, to begin the write operation, the host issues a request (step W1) asynchronously to request signals issued by each of the array channels (step W10). The host request is acknowledged by the host state machine (step W2) which generates a data strobe signal for shifting data received from the host into host data registers 21 through 24 (step W3). Two consecutive request, acknowledge and strobe cycles are necessary to fill the four host registers (step W3). After the host registers have been filled, the host state machine generates a data transfer strobe which shifts the data from the host registers into array registers 31 through 34 (step W6). After the array registers have been filled, the host state machine generates an array full status signal, AFUL, which is provided to the array state machine (step W7).

In consonance with the host state machine operations described above, the array state machine combines the individual request signals issued by the array channels into a single array request signal (step W11), generates an acknowledgement (step W12), then waits until receipt of the array full status signal AFUL from the host state machine (step W13) to generate an array strobe signal to shift data from array registers 31 through 34 into latches 41 through 44 (step W14). Operation is then returned to step W7 which checks to determine if array registers 31 through 34 are full. If neither the array (step W7) or host (step W8) registers are full, the write procedure described above is repeated until the host terminates the write request.

The flow chart of FIGS. 4A and 4B illustrates a method for transferring data from the disk array to the host device in accordance with the present invention. In a read operation, the disk array channels issue requests (step R1) asynchronously to the request issued by the host (step R9). The requests issued by the array channels are combined into a single array request (step R2) which is acknowledged by the array state machine (step R3). The acknowledge signal generates an array strobe signal to shift data from the array data channels 1 through 4 into array registers 81 through 84 if the array registers are empty (steps R4 through R6). Otherwise, the array state machine waits until the host machine empties array registers 81 through 84.

During the above array state machine operations, the host state machine generates an acknowledge signal in response to the request issued by the host (step R10) then waits for the array register full signal generated during step R4 (step R 1 1). As soon as the array registers are full, the host machine generates a data transfer signal to shift the data in the array registers into the host registers (steps R12 and R14) and a data strobe signal to shift data from the host registers to the host (steps R15 and R16). The read operation repeats until the array request is terminated (steps R7 and R8).

The table below lists and describes the signals received and generated by the host and array state machines for coordinating array read and write operations. An asterisk following a signal name indicates that the signal is active low.

| SIGNAL | DESCRIPTION |
|---|---|
| SYSCLK | System clock |
| DIR | Data transfer direction. "1" write, "0" read |
| HS.REQ | Host request signal |
| HS.STB* | Host strobe signal |
| DSTRB* | Data strobe signal |
| HFUL | Host register full signal |
| TX.STB | Data transfer strobe signal |
| AFUL | Array register full signal |
| ARRAY.STB | Array strobe signal |
| ADREQ | Array request signal |
| ADACK* | Array acknowledge signal |

The timing diagrams shown in FIGS. 5 and 6 illustrate the interrelationships between the above-identified signals for write and read operations, respectively. Several unique features are apparent from a review of the timing diagrams of FIGS. 5 and 6. For example:

1.) The host and array channels can issue requests independently of the host register status and array registers status. This feature overlaps all the SCSI handshake overhead with other data access and transfer operations.

2.) The host and array requests acknowledge signals can be extended to match any SCSI type interface, e.g., SCSI 1 or SCSI 2.

3.) The host request is asynchronous to the array requests. The host and array state machines use the register banks to synchronize the requests without impacting the SCSI transfer rate. It should be noted that the data register statuses are modified asynchronous to the system clock, minimizing the access cycle of both state machines.

4.) The host state machine has a cycle time (period of DSTRB* signal) less than or equal to five clock periods, which is less than the cycle time of any currently available SCSI chip. Each cycle effects the transfer of one data word.

5.) The array state machine has a cycle time (period of ADACK* signal) less than or equal to five clock periods. Each cycle effecting the transfer of two data words.

FIGS. 7 and 8 are schematic diagrams of logic within the host state machine for generating host register strobe signal HS.STB* and host register full signal HFUL. The logic shown in FIG. 7 generates signals DSTRB*, HS.STB and HS.STB* from a synchronous host request signal HS.REQS (a synchronized version of asynchronous host request signal HS.REQ), host register full signal HFUL, an acknowledge valid signal ACK.VALID, and a high-state signal identified as RAID3. The logic of FIG. 8 generates complementary signals HFUL and HFUL* from transfer signals TX.STB and TX.STB*, direction signals DIR and DIR*, data strobe signal DSTRB*, high-state signal RAID3, and a host reset signal HS.RST*.

Data transfer strobe signal TX.STB and array register full signal AFUL are generated by the host machine logic shown in the schematic diagram of FIG. 11. Transfer strobe signals TX.STB and TX.STB* and array register full signals AFUL and AFUL* are determined from prior-state register full signals HFUL and AFUL, host reset signal HS.RST, prior-state transfer strobe signal TX.STB*, direction signal DIR and DIR* and array strobe signal ARRAY.STB.

FIGS. 9, 10 and 12 are schematic diagrams of logic contained within the array state machine for generating combined array request signal ADREQ, array register strobe signal ARRAY.STB and the individual array channel acknowledge signals, respectively. The logic of FIG. 9 combines selected channel request signals ADREQ.CHAN1 through ADREQ.CHAN1 to generate the array request signal ADREQ. The channel request signals to combine are selected by setting corresponding enable signals PORT1.ACT through PORT-5.ACT low. FIG. 10 illustrates the state machine logic for generating array strobe signal ARRAY.STB. Signal ARRAY.STB is a function of signal DIR, a synchronized version of signal ADREQ, and an array interface read signal AIFREAD and array read strobe signal ARD.STB obtained by combining individual read and strobe signals from SCSI interface devices 61 through 65. A reset feature is provided with signal ADMARST. The logic shown in FIG. 12 generates individual array channel acknowledge signals ADACK.CHAN1 through ADACK.CHAN5 form array acknowledge signal ADACK. Individual array channel signals are generated for those channels selected by setting corresponding enable signals PORT1.ACT through PORT-5.ACT low.

The logic shown in FIGS. 7 through 12 is exemplary only and should be readily understood by one of ordinary skill in the art.

It can thus be seen that there has been provided by the present invention a simple method and circuit for effecting RAID level 3 transfers without the requirement of a large buffer between the host and the array of drives. The method of the invention effectively overlaps the SCSI handshake overhead with the data transfer between the SCSI host channel and the array of SCSI disk channels without impacting the performance, i.e., transfer rate and 1/0 rate, of the disk array implementation. Thus, expensive buffer memory costs are eliminated from the overall cost of disk array operations.

Although the presently preferred embodiment of the invention has been described, it will be understood that various changes may be made within the scope of the appended claims.

What is claimed is:

1. Apparatus for coupling a host bus associated with a host computer system with a plurality of array busses associated with an array of disk drives, comprising:
   a first register associated with each one of said plurality of array busses, each one of said first registers being connected to said host bus for receiving data therefrom;
   a second register associated with each one of said plurality of array busses, each one of said second registers being connected to a corresponding first register for receiving data therefrom and connected to its associated array bus for providing data thereto; and
   a third register associated with each one of said plurality of array busses, each one of said third registers being connected to its associated array bus for receiving data therefrom and connected to said host bus for providing data thereto.

2. Apparatus according to claim 1, further including:
   a state machine for coordinating the operation of said first, second and third registers;
   said state machine being connected to receive read and write request signals from said host system;
   said state machine including logic for generating strobe signals for effecting the transfer of data from said host bus into said first registers, the transfer of data from said first registers into corresponding second registers, and the transfer of data from said second registers onto corresponding array busses upon the receipt of a write request from said host system; and
   said state machine including logic for generating strobe signals for effecting the transfer of data from said array busses into corresponding third registers and the transfer of data from said third registers onto said host bus.

3. Apparatus according to claim 2, wherein said disk array is organized as a RAID level 3 disk array 4. Apparatus for transferring data between a host bus and a plurality of array busses, comprising:
   an array channel corresponding to each one of said plurality of array busses, each of said array channels comprising:
   a first register connected to said host bus for receiving data therefrom; and
   a second register connected to said first register for receiving data therefrom and connected to its associated array bus for providing data thereto; and
   a third register connected to its associated array bus for receiving data therefrom and connected to said host bus for providing data thereto.

5. Apparatus according to claim 4, further including:
   a state machine for coordinating the operation of said first, second, and third registers of each of said array channels;
   said state machine being connected to receive read and write request signals from said host system;
   said state machine including logic for generating strobe signals for effecting the transfer of data from said host bus into said first register of each of said array channels, the transfer of data from said first register of each of said array channels into the corresponding second register of each of said array channels, and the transfer of data from said second register of each of said array channels onto corresponding array busses upon the receipt of a write request from said host system; and
   said state machine including logic for generating strobe signals for effecting the transfer of data form said array busses into the corresponding third register of each of said array channels and the transfer of data from said third register of each of said array channels onto said host bus.

6. Apparatus for coupling a host computer system with a plurality of disk drives for operation in accordance with RAID level 3 disk array storage procedures,
   a SCSI adapter for coupling a host computer system with a host SCSI bus;
   a plurality of array SCSI busses;
   a SCSI bus interface corresponding to each one of said array busses, each interface for coupling a corresponding one of said array busses to a corresponding one of said plurality of disk drives;
   a first register corresponding to each one of said array busses and connected to said host bus for receiving data therefrom;
   a second register corresponding to each one of said array busses, each one of said second registers being connected to its corresponding first register for receiving data therefrom and connected to its corresponding array bus for providing data thereto; and
   a third register corresponding to each one of said array busses, each one of said third registers being connected to its associated array bus for receiving therefrom and connected to said host bus for providing data thereto.

7. The apparatus according to claim 6, wherein:
   said disk array is organized as a RAID level 3 disk array including first, second, third and fourth data disk drives and one parity disk drive; and
   said plurality of array busses comprises first, second, third and fourth busses corresponding with said data disk drives.

8. The apparatus according to claim 7, wherein:
   said SCSI adapter is a SCSI-2 device having a sixteen-bit data word connection with said host bus;
   said host bus comprises upper-byte and lower-byte busses, said upper byte bus providing connection between said SCSI adapter and the first registers and the third registers associated with said first and third array busses, said lower-byte bus providing connection between said SCSI adapter and the first registers and the third registers associated with said second and fourth array busses; and
   each one of said array busses provides an eight-bit connection between its corresponding first register, third register and SCSI interface.

9. Apparatus according to claim 8, further including:
   a state machine for coordinating the operation of said first, second and third registers;
   said state machine being connected to receive read and write request signals from said host system;
   said state machine including logic for generating strobe signals for effecting the transfer of data from said host bus into said first register, the transfer of data from said first registers into corresponding second registers, and the transfer of data from said second registers onto corresponding array busses upon the receipt of a write request from said host system; and said state machine including logic for generating strobe signals for effecting the transfer of data from sad array busses into corresponding third registers and the transfer of data from said third registers onto said host bus.

10. Apparatus for coupling a host computer system with a plurality of disk drives for operation in accordance with RAID level 3 disk array storage procedures, a SCSI adapter for interfacing with said host computer;

a plurality of array channels, each channel including:

a first register connected to said SCSI adapter for receiving data therefrom;

a second register connected to said first register for receiving data therefrom;

a SCSI interface device connected to said second register for receiving data therefrom, said SCSI interface device for interfacing with one of said plurality of disk drives;

a third register connected to said SCSI interface device for receiving data therefrom and connected to said SCSI adapter for providing data thereto.

11. In a computer system including a disk array, a method for transferring data from a host bus to a plurality of array busses, comprising the step of:

writing data from said host bus into a plurality of first register, each one of said first registers being associated with one of said plurality of array busses, each one of said first registers receiving a portion of the data provided from said host bus;

transferring data written into said plurality of first registers to a corresponding plurality of second registers, each one of said second registers being connected to a corresponding array bus; and transferring data written into said plurality of second registers to their corresponding array busses.

12. In a computer system including a disk array, a method for transferring data from a plurality of array busses to a host bus, comprising the steps of:

writing data from said plurality of array busses into a corresponding plurality of array registers; and transferring data written into said plurality of array registers to said host bus.

* * * * *

UNITED STATES PATENT AND TRADEMARK OFFICE
CERTIFICATE OF CORRECTION

PATENT NO. : 5,287,462
DATED : Feb. 15, 1994
INVENTOR(S) : Mahmoud K. Jibbe, et al.

It is certified that error appears in the above-indentified patent and that said Letters Patent is hereby corrected as shown below:

Column 8, line 8, delete "form" and substitute --from--.

Column 8, line 35, add --data-- at the beginning of the line.

Column 8, line 65, delete "register" and substitute --registers--.

Signed and Sealed this

Fifth Day of July, 1994

Attest:

BRUCE LEHMAN

*Attesting Officer*     *Commissioner of Patents and Trademarks*